United States Patent
Mochimaru

[11] 3,765,760
[45] Oct. 16, 1973

[54] ZOOM MECHANISM FOR A REPRODUCING APPARATUS

[75] Inventor: Hideaki Mochimaru, Tokyo, Japan

[73] Assignee: Ricoh Co., Ltd., Tokyo, Japan

[22] Filed: Dec. 27, 1971

[21] Appl. No.: 211,919

[30] Foreign Application Priority Data
Dec. 26, 1970  Japan.............................. 45/118615

[52] U.S. Cl........................ 355/58, 95/45, 350/187
[51] Int. Cl. .............................................. G03b 27/36
[58] Field of Search.......................... 355/58; 95/45; 350/44, 187

[56] References Cited
UNITED STATES PATENTS
3,550,518   12/1970   Himmelsbach et al. .......... 355/58 X
3,533,344   10/1970   Thomas .................................. 95/45

Primary Examiner—Samuel S. Matthews
Assistant Examiner—E. M. Bero
Attorney—Henry T. Burke et al.

[57] ABSTRACT

In a zoom mechanism for a reproducing apparatus wherein an original surface and an image formation surface are fixed and zooming is effected by moving a lens system between those surfaces and in which during movement two lenses within the lens system are moved axially relative to each other by a cam follower means riding on a cam surface, the cam surface is formed by surface portions on two cam plates which have a common pivot point at their adjacent ends so that by adjusting the orientation of each plate with respect to the other about the pivot point, the spacing between the two lenses may be appropriately varied through the action of the cam follower means during movement of the lens system to correct for focus shifting.

3 Claims, 3 Drawing Figures

INVENTOR
HIDEAKI MOCHIMARU

ZOOM MECHANISM FOR A REPRODUCING APPARATUS

BACKGROUND OF THE INVENTION

The present invention relates to a zoom mechanism for a reproducing apparatus wherein an original surface and an image formation surface are fixed and zooming is effected by moving a lens between those surfaces.

In a zoom mechanism of the above-mentioned type, though the ideal is that there is not a focus shift at the time of zooming, it is impossible to completely remove the focus shift from the point of view of manufacturing a lens. Therefore, in the present invention, it is intended to provide a mechanism which makes a simple adjustment of the focus shift possible within a practically allowable range.

BRIEF DESCRIPTION OF THE DRAWINGS

For a better understanding of the invention as well as other objects and further features thereof, reference is made to the following description of the invention taken in conjunction with the accompanying drawings wherein.

DETAILED DESCRIPTION OF THE INVENTION

Figure 1:
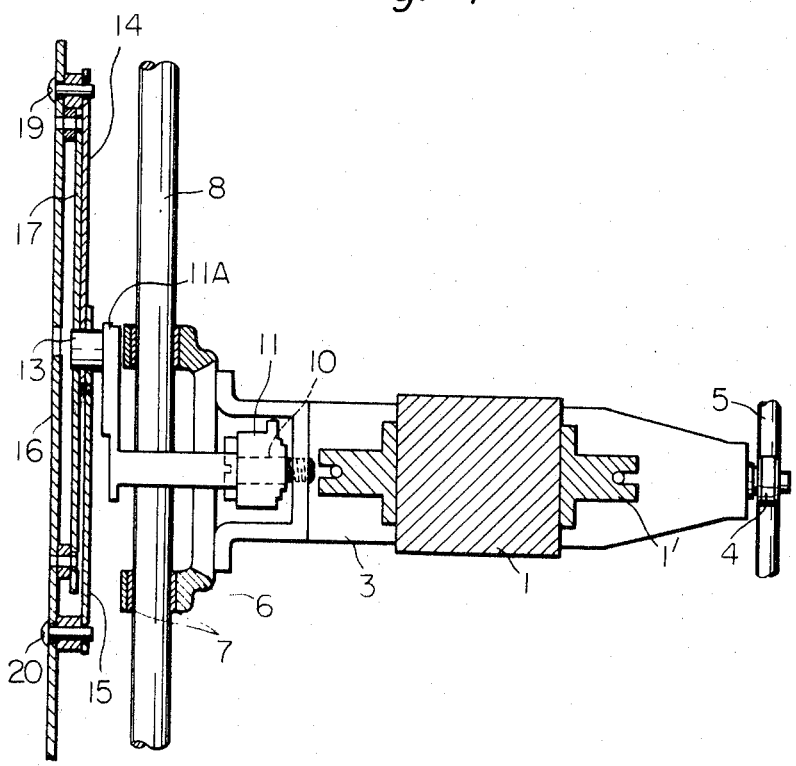
FIG. 1 is a plan view of a zoom mechanism in accordance with the present invention.

In FIG. 1, master lens 1 is fixed to lens carrier 3 through bracket 1'. The lens carrier 3 is rotatably mounted at an end for movement along guide bar 5 through a roller 4 and at its other end it is mounted slidably on guide bar 8 through bearing 7 by a bracket 6 fixed to the carrier 3. Because of this, the optical lens system of which lens 1 is a part that can be moved to a position wherein a predetermined magnification is obtainable.

Figure 2:
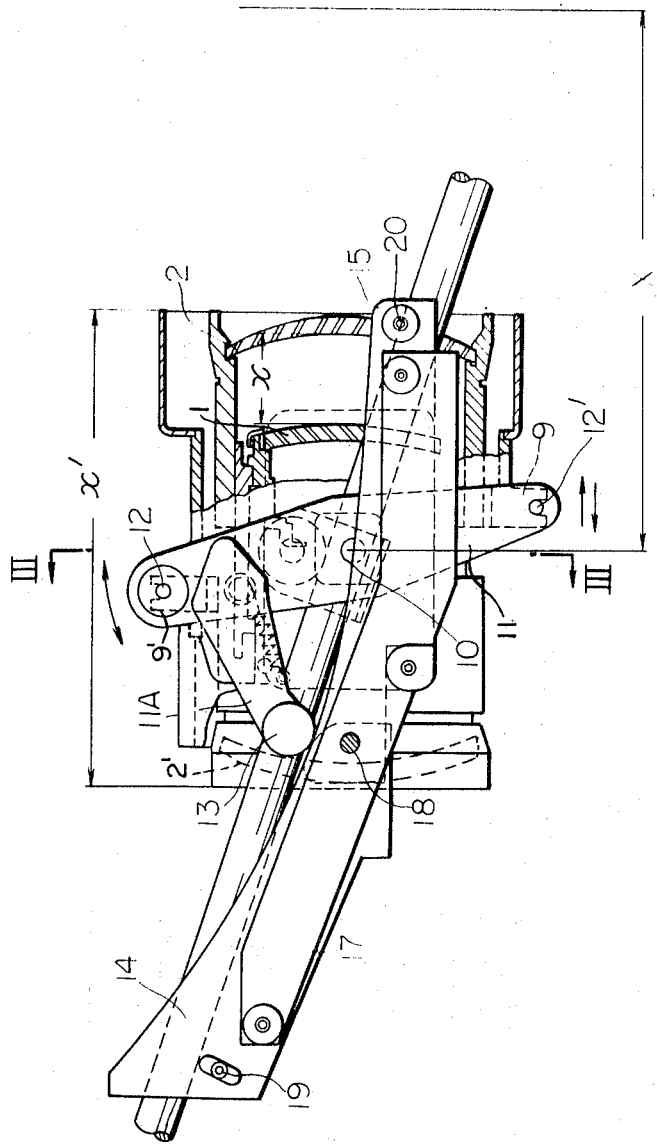
FIG. 2 is a side view of the zoom mechanism shown in FIG. 1.
Figure 3:
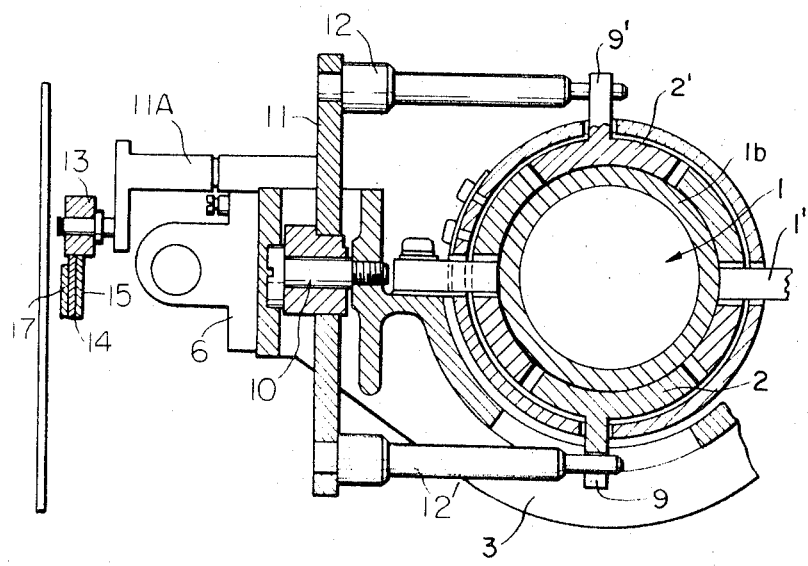
FIG. 3 is a sectional view taken along III—III line of FIG. 2.

In FIG. 2, the remainder of the zoom lens system is shown in the form of first lenses 2 and 2', which are slidably mounted symmetrically with respect to the master lens 1 for movement along the outer surface of its lens cell 1b and fork shaped portions 9 and 9' are fixed to each first lens. Lever 11 is rotatably mounted to the bracket 6 through shaft pin 10 and shafts 12 and 12' fixed to both arm ends of said lever 11 are fitted for cooperation with the fork shaped portions 9 and 9' of the first lenses 2 and 2' respectively. On the other side, a follower roller 13 mounted to a projection 11A of the lever 11 is rotated along a cam surface formed by two cam surface portions 14' and 15' on plates 14 and 15 in accordance with the present invention, in such manner that the lever 11 is oscillated about the shaft pin 10. When the lever 11 is thus oscillated, the first lenses 2 and 2' are moved symmetrically relative to the master lens 1 through the shafts 12 and 12' fixed to the arm ends of the lever 11, whereby the lens intervals $x$ for obtaining a required magnification is kept.

The relation between an optical distance X from the center of master lens 1 to an original surface or an image formation surface and the above-mentioned lens interval $x$ is predetermined by the design of the lens, and then the mounting position and the shape of the cam surface is set so as to satisfy the above-mentioned relation. In the most desirable case, if the lens is manufactured correctly in accordance with the design, the optimum focus surface is not moved at the time of changing magnification and so, the cam can be made integrally. However, this cannot be expected in practice and even if an original surface or an image formation surface are adjusted to form a best focus image at a certain magnification, it is common that images at other magnifications are not good.

Therefore, a mechanism is needed which is adjustable to make images of the best focus at any magnification. This is achieved by making a plate cam which determines the lens interval $x$ in accordance with the present invention to be composed of two cam portions 14' and 15', as mentioned above, and by composing these portions to be rotatable about a common shaft 18 on a cam base plate 17 fixed to a machine frame 16 and fixable to any desired position. In that case, though cam plates 14 and 15 have superposed end portions at the common shaft 18, the curves at the superposed end portions of both cam surface portions 14' and 15' are selected so as to smoothly merge at the joint when both cam plates are rotated mutually. After the composite cam curve of the cam portions 14' and 15' is adjusted, the cam base plate 17 is fixed to the machine frame 16. A hole provided in the machine frame 16 for fixing the cam base plate 17 is preferably made long so as to permit maximum adjustment. Then the opposite ends of both cam plates 14 and 15 are fixed to the machine frame 16 by screws 19 and 20. The hole provided in the machine frame 16 for fixing is also preferably made long.

It is preferable that the practical adjustment is made as follows. First, the hole lenses are positioned at a designed same magnification place of X and the position of the cam base plate 17 is determined to satisfy $x$ corresponding to it. The cam base plate 17 is made to be able to somewhat move up and down relative to the machine frame 16, as is mentioned above, by making long the mounting hole of the machine frame. In this case, as the practical value of $x$ cannot be measured, the value of $x$ is confirmed by reading the whole length $x$ of cells 2 and 2' of the first lenses and the base plate 17 is fixed by making the cam to contact with the outer surface of the cam follower roller 13 at the time. Next, cam plates 14 and 15 are adjusted through rotation so as to be able to obtain the best focus at both extremities of variable magnification and are fixed by the screws 19 and 20. The focus adjustment at this time can be done by placing a test chart on the image formation surface, placing a focus glass (ground glass) on the surface of an original and watching through a magnifier.

Since the rotational center (the center of the shaft 18) of the cam plates 14 and 15 is positioned near the cam follower roller 13 at the time of the same magnification, even if the cam portions are rotated for adjusting the focuses at the both extremities, there is no possibility that the initially adjusted lens interval at the time of the same magnification will get out of order.

By means of a zoom mechanism of the present invention, it is possible to correct a focus shift at the time of changing magnification owing to an error in manufacturing a zoom lens easily by a simple construction.

What is claimed is:

1. A zoom mechanism for a reproducing apparatus wherein an original surface and an image formation surface are fixed, and zooming is effected by moving a lens system between said surfaces, said lens system being mounted on a lens carrier and having two lenses axially movable relative to each other, wherein the improvement comprises means for correcting for focus shifting during movement of the lens system comprising:

a. lever means pivoted to said lens carrier and operatively connected to said two lenses for axially varying the spacing between said lenses upon pivoting;

b. cam follower means connected to said pivoted lever means;

c. two cam plates, each having an end pivoted at a common point and surface portions cooperating to form a continuous cam surface on which said cam follower means rides so as to pivot said lever means and vary the spacing between said lenses in accordance with said cam surface;

d. support means having a pivot thereon on which said two cam plates are mounted at the common point; and e. means for adjusting the orientation of each of said two cam plates with respect to each other about said common point to permit variation of the form of said cam surface to accordingly control the spacing variation between said two lenses during movement of the lens system and correct for focus shifting.

2. A mechanism as in claim 1 wherein said support means comprises:

f. frame means for supporting said lens carrier; and g. a base plate adjustably mounted on said frame means and including said pivot.

3. A mechanism as in claim 2 wherein said orientation adjusting means comprises means for releasably fastening said two cam plates to said frame means.

* * * * *